(12) United States Patent
Ishida et al.

(10) Patent No.: US 8,458,359 B2
(45) Date of Patent: Jun. 4, 2013

(54) SYSTEM FOR THE INTERNET CONNECTIONS, AND SERVER FOR ROUTING CONNECTION TO A CLIENT MACHINE

(75) Inventors: Atsuki Ishida, Tokyo (JP); Nobuaki Tanaka, Tokyo (JP); Takafumi Kusano, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 119 days.

(21) Appl. No.: 13/048,480

(22) Filed: Mar. 15, 2011

(65) Prior Publication Data

US 2011/0167162 A1 Jul. 7, 2011

Related U.S. Application Data

(63) Continuation of application No. 10/537,279, filed as application No. PCT/JP03/15342 on Dec. 1, 2003, now Pat. No. 7,934,014.

(30) Foreign Application Priority Data

| Nov. 29, 2002 | (JP) | 2002348543 |
| Jun. 5, 2003 | (JP) | 2003161246 |
| Oct. 3, 2003 | (JP) | 2003345390 |

(51) Int. Cl.
*G06F 15/173* (2006.01)
(52) U.S. Cl.
USPC .......................................................... 709/238
(58) Field of Classification Search
USPC ............................................... 709/227, 238
See application file for complete search history.

(56) References Cited

U.S. PATENT DOCUMENTS

| 6,233,686 | B1 | 5/2001 | Zenchelsky et al. |
| 6,288,716 | B1 | 9/2001 | Humpleman et al. |
| 6,405,310 | B1 | 6/2002 | Simpson |
| 6,708,219 | B1 * | 3/2004 | Borella et al. ............... 709/245 |
| 6,978,314 | B2 | 12/2005 | Tarr |
| 7,188,191 | B1 | 3/2007 | Hovell et al. |

(Continued)

FOREIGN PATENT DOCUMENTS

| CN | 1376351 | 10/2002 |
| EP | 1111506 | 6/2001 |

(Continued)

OTHER PUBLICATIONS

European Patent Office, Supplementary European Search Report, Application No. 03812362.6, dated Oct. 27, 2008, 2 pages.

(Continued)

*Primary Examiner* — Jason Recek
(74) *Attorney, Agent, or Firm* — Haynes & Boone, LLP

(57) ABSTRACT

The purpose of the present invention is to provide an Internet connection system which is capable of benefiting from the IPv6 by relatively easy manner and in which manufacturers of client-side devices can create added values for users. IPv6 packets are transmitted by a tunneling connection between a home network and a server on the Internet. Also terminal devices present in the home network can be uniquely recognized and controlled from outside via the server. Since all communications are performed via the server on the Internet regardless of the carrier and the ISP, the terminal device and all connections to the terminal device can be freely configured and controlled by the owner or the manufacturer of the server on the Internet.

27 Claims, 9 Drawing Sheets

U.S. PATENT DOCUMENTS

| | | |
|---|---|---|
| 7,360,245 B1 | 4/2008 | Ramachandran et al. |
| 2001/0012296 A1 | 8/2001 | Burgess et al. |
| 2001/0034759 A1 | 10/2001 | Chiles et al. |
| 2002/0046348 A1* | 4/2002 | Brustoloni .............. 713/201 |
| 2002/0052719 A1 | 5/2002 | Alexander et al. |
| 2002/0065921 A1* | 5/2002 | Davidson et al. .......... 709/227 |
| 2002/0073215 A1 | 6/2002 | Huitema et al. |
| 2002/0188741 A1 | 12/2002 | Szucs et al. |
| 2003/0074443 A1* | 4/2003 | Melaku et al. .............. 709/224 |
| 2003/0177246 A1* | 9/2003 | Goodman et al. .......... 709/228 |
| 2003/0220892 A1* | 11/2003 | Hand et al. ................ 707/1 |
| 2004/0088385 A1* | 5/2004 | Blanchet et al. .......... 709/220 |

FOREIGN PATENT DOCUMENTS

| | | |
|---|---|---|
| JP | 11187061 | 7/1999 |
| WO | WO-9806204 | 2/1998 |
| WO | WO-0122683 A1 | 3/2001 |
| WO | WO-0122683 A2 | 3/2001 |
| WO | WO-0122683 A3 | 3/2001 |
| WO | WO-0131888 | 5/2001 |
| WO | WO-0141395 | 6/2001 |
| WO | WO-02/37299 | 5/2002 |

OTHER PUBLICATIONS

Japanese Patent Office, International Search Report, Application No. PCT/JP03/15342, dated Feb. 10, 2004, 2 pages.

European Patent Office, European Search Report, Application No. 12152022.5, dated Mar. 23, 2012, 6 pages.

Wa, Toshio Yoneza, et al., "3F-4IPv6 Tunnel Broker Jitsugen no tame no Ichihoshiki ni Tsuite," Dai 63 Kai (Heisei 13 Nen Koki) Zenkoku Taikai Koen Ronbunshu (3), Information Processing Society of Japan, Sep. 26, 2001, pp. 3-435 to 3-436.

Aso, Kazuto, Technology Scope IPv6 eno Iko Shuho Kyozon to Kokan no 2-type 4-Shurui Yoto ni Ojite Tsukai Wake, Nikkei Communications, Apr. 2, 2001, No. 339, pp. 122-129.

* cited by examiner

InterBOX Name (Address/Prefix):

| IPv6 Terminal Name | Owner | State | Equipment Type | Model Number | |
|---|---|---|---|---|---|
| 1 | Father | Power ON | VCR | XX1 | [Operation Screen] |
| 2 | Father | Power ON | TV | YY2 | [Operation Screen] |
| 3 | Father | Power OFF | PC | SS3 | [Operation Screen] |
| 4 | Father | Power ON | Camera | FF4 | [Operation Screen] |

FIG. 8

Search Interface 43

InterBOX Information
  InterBOX Name (Domain Name/Prefix):
  [                    ]
  Location:
  [                    ]

44

IPv6 Terminal Information
  State Information  [        ▼]
  Model Information  [        ▼]
  Type Information   [        ▼]

[ Start Search ]  [ Cancel ]

FIG. 7

SYSTEM FOR THE INTERNET CONNECTIONS, AND SERVER FOR ROUTING CONNECTION TO A CLIENT MACHINE

CROSS REFERENCE TO RELATED APPLICATIONS

The present application is a continuation of U.S. patent application Ser. No. 10/537,279, filed Nov. 21, 2005 now U.S. Pat. No. 7,934,014, which is a Section 371 national phase filing of International Application No. PCT/JP03/15342, filed Dec. 1, 2003, which claims priority to Japanese patent application No. 2002-348543, filed Nov. 29, 2002, Japanese patent application No. 2003-161246, filed Jun. 5, 2003, and Japanese patent application No. 2003-345390, filed Oct. 3, 2003. The entire disclosures of the aforesaid applications are incorporated herein by reference.

FIELD OF THE INVENTION

The present invention relates to a system and a server used in the system for realizing a network with the next generation IP, IPv6 (Internet Protocol version 6), and providing a home IPv6 environment with services from the server in the current infrastructure environment broadly employing the IPv4 (Internet Protocol version 4).

BACKGROUND OF THE INVENTION

In a service delivery environment through Internet-centered public networks, values of all information are generally located on a server side rather than a client side.

Each client (terminal device) is basically a viewer, which browses information on the Internet. Each client issues various requests to obtain information from the Internet, which in return sends back information for the client. It means that all information is collected on the Internet, which offers formulaic information single-directionally. For this reason, it is difficult for manufacturers of terminal devices to create added values for users.

In order to change this circumstance, the server-client relationship must be reversed by inverting the access direction. For a home network connected to the Internet, for example, an environment must be created such that access from the Internet to the home network is initiated, and services are provided by the home network to the Internet.

To achieve this, the internet network needs to be able to uniquely identify each device connected to the home network. Home routing and security problems need also to be resolved. One of the technologies to address this issue is the IPv6 (Internet Protocol version 6).

However, in view of the circumstances regarding the current Japanese carriers and Internet service providers, it can be surmised that a considerable amount of time will have to be expended until the IPv6 becomes widely available. For example, it will take at least 2 to 3 years for the currently available IPv4 to depreciate, and the IPv6 service has just started on a test basis.

In order to achieve an IPv6-enabled network quickly, manufacturers will need to expand their business to include ISP level services, which is very costly and unrealistic.

Furthermore, home network environments vary tremendously with their connection mechanisms varying very widely depending on their carriers and ISP's. Therefore, a new, standardized approach is needed to realize the IPv6 environment by taking into account all these variations.

In view of the above situation, the purpose of the present invention is to provide an Internet connection system which is capable of benefiting from the IPv6 by relatively easy means and in which manufacturers of client devices can create added values for users.

SUMMARY OF THE INVENTION

In order to achieve the above object, according to a first principal aspect of the present invention, there is provided an Internet connection system, comprising: a relay device connected to a client device and provided in a first network, the first network communicated in a first protocol; and a server connected to the relay device through a second network in a second protocol, wherein the relay device comprises: a client device global address storage section for storing a global address of the client device in the first protocol; a server address storage section for storing a global address of the server in the second protocol; a first routing device for routing a connection from the client device through the server based on the global address of the server stored in the server address storage section; and a first packet processing device for capsulating/decapsulating packets, the packets in the first protocol, using the second protocol to thereby establish a tunneling connection with the server in the first protocol, and wherein the server comprises: a second packet processing device for capsulating/decapsulating packets, the packets in the first protocol, using the second protocol to thereby establish a tunneling connection with the relay device; a client device global address management device for managing the global address of the client device in the first protocol, the client device connected to the relay device, in association with a global address of the relay device in the second protocol; and a second routing device for routing a connection to the relay device based on the global address of the client device managed by the client device global address management device.

According to such a structure, IPv6 packets are transmitted by a tunneling connection between a home network and a server on the Internet. Also terminal (client) devices present in the home network can be uniquely recognized and controlled from outside via the server. Since all communications are performed via the server on the Internet regardless of the carrier and the ISP, the terminal device and all connections to the terminal device can be freely configured and controlled by the owner or the manufacturer of the server on the Internet.

This means that all problems related to conventional in-home routing, security and individual identification of an IPv6 device where IPv6 and IPv4 coexist can be solved, and extremely open and yet closed networks can be realized.

In this case, the first and second protocols may be different or the same. In the most preferred embodiment, however, the first protocol is IPv6 and the second protocol is IPv4.

According to one embodiment of the present invention, the server further comprises a model identification section for determining if the client device is of a predetermined model and/or the relay device is of a predetermined model. In this case, the server preferably further comprises a communication session disconnection section for disconnecting communication sessions or limiting packet transmissions if the model identification section determines that the client device or the relay device is not of the predetermined model. Additionally, the server may further comprise a command conversion section for converting a command to be sent to the client device to a command in a predetermined format to control the client device based on results from the model identification section. Moreover, the server preferably further comprises a client device control section for controlling the client device based on results from the model identification section.

According to another embodiment, the server further comprises a network type identification section for determining if an environment of the first network connected with the client device and/or the relay device is of a predetermined type. In this case, the server preferably further comprises a communication session disconnection section for disconnecting communication sessions or limiting packet transmissions if a private network environment connected with the client device or the relay device is determined not of the predetermined type. In this case, the server preferably further comprises a state information obtaining section for obtaining at least one of an operation state, a usage state and location information of the client device and/or the relay device; and this state information obtaining section preferably obtains at least one of the operation state, the usage state and location information of the client device using a method according to a model of the client device.

According to yet another embodiment, the server comprises a search section for searching for the client device or the relay device based on at least one of the global address, the operation state, the usage state and the location information of the client device or the relay device. In this case, the search section preferably comprises a means for displaying a list of the client devices connected to each relay device. In this case, the server preferably further comprises a client device control section for controlling the client device, wherein the client device control section preferably selects a specific client device from the list to thereby activate a control program for the specific client device.

According to yet another embodiment, the server further comprises a client device address search section for searching for the global address of the client device in the first protocol based on a connection request to the client device. In this case, the server preferably further comprises a connection requester authentication section for authenticating a user who requested a connection to the client device to thereby permit or deny the connection to the client device.

According to yet another embodiment, the internet connection system further comprises a tunneling connection information management device for managing information of the tunneling connection between the relay device and the server, wherein the tunneling connection information management device notifies the relay device of the global address of the server in the second protocol, and notifies the server the global address of the relay device in the second protocol and an entirety or part of the global address of the client device in the first protocol. In this case, the tunneling connection information management device preferably authenticates the relay device or the server and, if the authentication result is positive, performs the notification as above.

According to yet another embodiment, the server further comprises a filtering processing device for filtering communications to/from the client device according to predetermined rules. Preferably in this case, the server further comprises a filtering rule setup section for providing an interface for editing the predetermined rules.

According to yet another embodiment, the relay device further comprises a model identification section for determining if the client device is of a predetermined model. In this case, the relay device preferably further comprises a communication session disconnection section for disconnecting communication sessions if the model identification section determines that the client device is not of the predetermined model.

According to a second principal aspect of the present invention, there is provided a relay device, used in an Internet connection system which comprises: the relay device connected to a client device and provided in a first network, the first network communicated in a first protocol; and a server connected to the relay device through a second network in a second protocol, comprising: a client device global address storage section for storing a global address of the client device in the first protocol; a server address storage section for storing a global address of the server in the second protocol; a first routing device for routing a connection from the client device through the server based on the global address of the server stored in the server address storage section; and a first packet processing device for capsulating/decapsulating packets, the packets in the first protocol, using the second protocol to thereby establish a tunneling connection with the server in the first protocol.

According to a third principal aspect of the present invention, there is provided a server, used in an Internet connection system which comprises: a relay device connected to a client device and provided in a first network, the first network communicated in a first protocol; and the server connected to the relay device through a second network in a second protocol, comprising: a second packet processing device for capsulating/decapsulating packets, the packets in the first protocol, using the second protocol to thereby establish a tunneling connection with the relay device; a client device global address management device for managing a global address of the client device in the first protocol, the client device connected to the relay device, in association with a global address of the relay device in the second protocol; and a second routing device for routing a connection to the relay device based on the global address of the client device managed by the client device global address management device.

According to a forth principal aspect of the present invention, there is provided a server, used in an Internet connection system which comprises: a relay device provided in a first network; and the server connected to a client device through the relay device and the Internet, the client device connected to the first network, comprising: a client device address management device for managing an address of the client device connected to the relay device in association with an address of the relay device; a routing device for routing a connection, the connection from the Internet to the client device, to the relay device connected to the client device based on the address of the client device managed at the client device address management device; a model identification section for determining if the client device is of a predetermined model and/or the relay device is of a predetermined model; and a command conversion section for converting a command to be sent to the client device to a command in a predetermined format to control the client device based on results from the model identification section.

According to such a structure, the model of a terminal device present in the home network can be uniquely recognized from outside via the server. Then the terminal device can be controlled according to its model. Since all communications are performed via the server on the Internet regardless of the carrier and the ISP, the terminal device and all connections to the terminal device can be freely configured and controlled by the owner or the manufacturer of the server on the Internet.

According to one embodiment of the present invention, the server further comprises a communication session disconnection section for disconnecting communication sessions or limiting packet transmissions if the model identification section determines that the client device or the relay device is not of the predetermined models.

Additionally, according to another embodiment of the present invention, the client device includes a peripheral device which is communicable with the relay device but cannot by itself connect to the Internet.

According to yet another embodiment, the server further comprises a network type identification section for determining if an environment of the first network connected with the client device and/or the relay device is of a predetermined type. In this case, the server preferably further comprises a communication session disconnection section for disconnecting communication sessions or limiting packet transmissions if a private network environment connected with the client device or the relay device is determined not of the predetermined type.

According to yet another embodiment of the present invention, the server further comprises a state information obtaining section for obtaining at least one of an operation state, a usage state and location information of the client device and/or the relay device. In this case, the state information obtaining section obtains at least one of the operation state, the usage state and the location information of the client device using a method according to a model of the client device. Also, the server further comprises a client device control section for controlling the client device, and this client device control section has a means for displaying to a user at least one of the operation state, the usage state and the location information of the client device.

The server further comprises a search section for searching for the client device or the relay device based on at least one of the address, the operation state, the usage state and the location information of the client device or the relay device. This search section comprises a means for displaying a list of client devices found by the search section, each with the operation state. The means also displays a list of client devices connected to each relay device. Moreover, the server further comprises a client device control section for controlling the client device, wherein the client device control section preferably selects a specific client device from the list to thereby activate a control program for the specific client device.

According to yet another embodiment, the relay device is provided in the client device.

According to yet another embodiment, the server further comprises a second packet processing device for capsulating/decapsulating packets, the packets in a first protocol, using a second protocol to thereby establish a tunneling connection with the relay device; a client device global address management device for managing a global address of the client device in the first protocol, the client device connected to the relay device, in association with a global address of the relay device in the second protocol; and a second routing device for routing a connection to the relay device based on the global address of the client device managed by the client device global address management device. The first and second protocols may be different or the same.

The server preferable further comprises a client device address search section for searching for the global address of the client device in the first protocol based on a connection request to the client device. Preferably in this case, the server further comprises a connection requester authentication section for authenticating a user who requested a connection to the client device to thereby permit or deny the connection to the client device.

The server further comprises a tunneling connection information management device for managing information of the tunneling connection between the relay device and the server, wherein this tunneling connection information management device notifies the relay device of the global address of the server in the second protocol, and obtains the global address of the relay device in the second protocol and an entirety or part of the global address of the client device in the first protocol. In this case, the tunneling connection information management device preferably authenticates the relay device and, if the authentication result is positive, performs the notification as above.

According to yet another embodiment, the server further comprises a filtering processing device for filtering communications to/from the client device according to predetermined rules. Preferably in this case, the server further comprises a filtering rule setup section for providing an interface for editing the predetermined rules.

According to the server employed in the Internet connection system of the present invention, it is possible to provide an Internet connection system which is capable of benefiting from the IPv6 by relatively easy means and in which manufacturers of client devices can create added values for users.

Other characteristics and marked effects of the present invention will become apparent to those skilled in the art upon referring to explanations of the following DETAILED DESCRIPTION OF THE PREFERRED EMBODIMENTS when taken in conjunction with the accompanying drawings.

BRIEF DESCRIPTION OF THE DRAWINGS

FIG. 7 is a diagram showing an example of a search screen;

FIG. 8 is a diagram showing an example of a list display of search results for the InterBOX;

DETAILED DESCRIPTION OF THE PREFERRED EMBODIMENTS

Embodiments of the present invention are described below with reference to the accompanying drawings.

Figure 1:
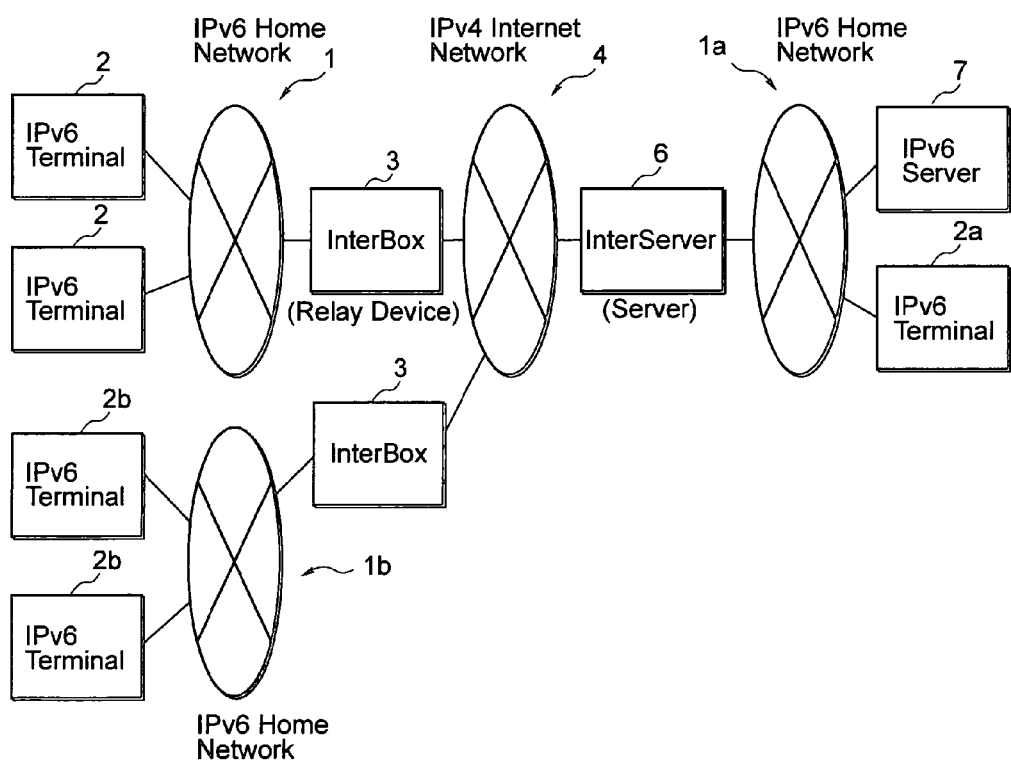
FIG. 1 is a diagram showing an example of network structure according to one embodiment of the present invention.

FIG. 1 is a diagram showing an example of a network structure according to one embodiment of the present invention.

Indicated with a reference numeral 1 in this figure is an IPv6 home network connected to various types of client IPv6 terminals 2 (hereafter, each referred to as an "IPv6 terminal") communicating using IPv6 (a first communication protocol). The IPv6 home network 1 is, for example, structured using a LAN implemented in each home.

The IPv6 home network 1 is connected to an IPv4 Internet network 4 via an InterBOX 3 (a "relay device" of the present invention) and a communication carrier/ISP. In the IPv4 Internet network 4, communications are performed using IPv4 (a second communication protocol), which is widely used unlike the above IPv6.

Connected to the IPv4 Internet network 4 is an InterServer 6 (a server according to the present invention) for controlling communications of the IPv6 terminal 2 on the IPv6 home network 1. As described in greater detail herein below, the InterServer 6 in this figure has broker functions for connecting the IPv6 terminal 2 to IPv6 terminals 2a and an IPv6 server 7 on another IPv6 home network 1a, to IPv6 terminals 2b on yet another IPv6 home network 1b, and to other devices on the IPv4 internet network 4.

Here, the InterBOX 3 and the InterServer 6 are intended to be produced by the same manufacturer or under a unified standard, and are designed to interface with each other. Stored in the InterBox 3 is a global address of the InterServer 6 with IPv4 so that the InterBox 3 can be always routed and connected to the InterServer 6 regardless of the carrier or ISP. Additionally the IPv6 terminal 2 connected to the IPv6 home network 1 is also intended to be produced by the same manufacturer as that of the InterBox 3 or under a unified standard, and configured so that a type (model) or the like of the IPv6 terminal 2 is identifiable on the InterServer 6 based on, for example, an IPv6 global address assigned to the IPv6 terminal 2.

There are various possible techniques for assigning an IPv6 global address to the IPv6 terminal 2. An IPv6 global address is 128-bit structured, comprising a "prefix" section configured in the first half which is assigned from the NIC or ISP, and an "interface ID" section configured in the second half which can be uniquely generated by a user. A prefix assigned to the manufacturer may be used in combination with an interface ID generated based on a MAC address specific to the terminal. Also, an IPv6 terminal 2 factory default may be used. Further, the address may be automatically generated via a connection to the InterBOX 3, by using an IPv6 address prefix of the InterBOX 3 and the IPv6 terminal's MAC address. Note that the IPv6 terminal 2 may be a conventional home appliance such as a VCR or a TV, which by itself cannot connect to the Internet. In this case, the InterBOX may be provided with an predetermined interface (IEEE1394) communicable with these home appliances, and a virtual IP address may be assigned to each home appliance as an ID (unique ID).

Figure 2:
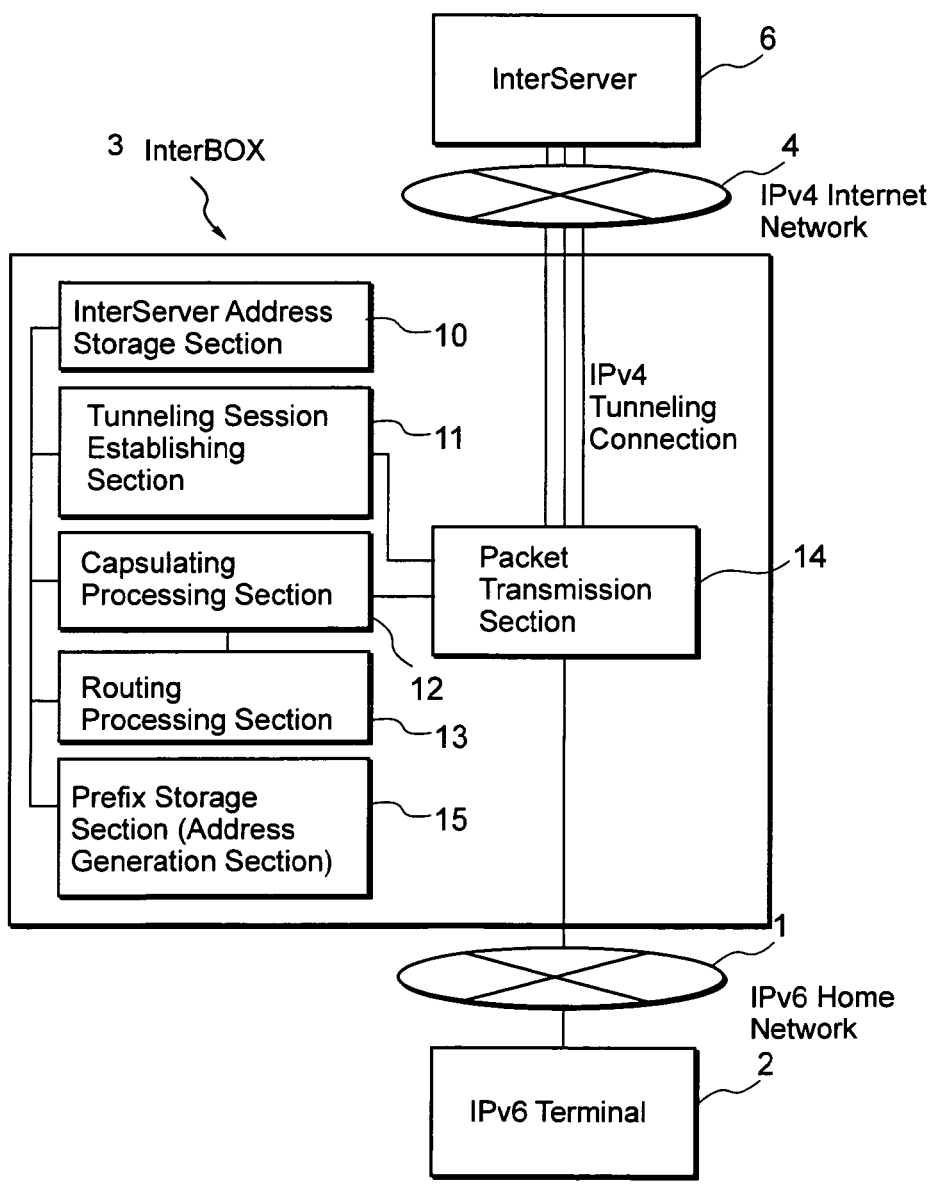
FIG. 2 is a schematic structural view showing an example of an InterBOX according to one embodiment of the present invention.

FIG. 2 is a schematic structural view showing the InterBOX 3.

The InterBOX 3 has an InterServer address storage section 10 for storing a global address of the InterServer 6 with IPv4; a tunneling session establishing section 11 for establishing a tunneling connection with the InterServer 6 based on the InterServer 6's address; a capsulating processing section 12 for capsulating/decapsulating IPv6 packets using IPv4 and performing tunneling transmissions with the InterServer 6; a routing processing section 13 for routing the decapsulated packets from the InterServer 6 to a desired IPv6 terminal 2; and a packet transmission section 14 for transmitting the packets. Also the InterBOX 3 is provided with a prefix storage section 15 (an address generation section) for generating an address for the IPv6 terminal 2 using the prefix assigned to the InterBOX 3.

According to such a structure, packets to or from the IPv6 terminal 2 can be transmitted through a tunnel established with IPv4 between the InterServer 6 and the InterBOX 3.

Figure 3:
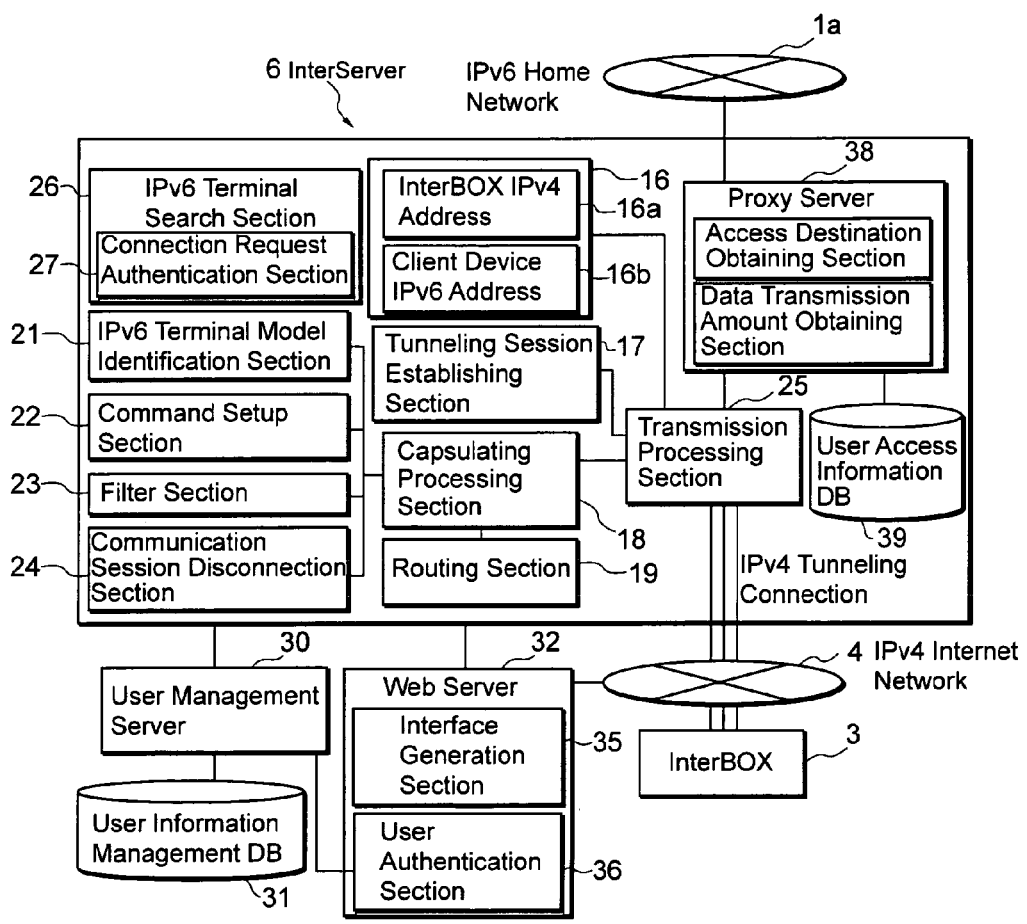
FIG. 3 is a schematic structural view showing an example of an InterServer according to one embodiment of the present invention.

FIG. 3 is a schematic structural view showing the InterServer 6.

The InterServer 6 has an address storage section 16 for associating and storing a global address of the InterBOX 3 with IPv4 (an InterBOX IPv4 address 16a) and a global address of the client device with IPv6 (a client device IPv6 address 16b); a tunneling session establishing section 17 for establishing a tunneling connection with the InterBOX 3 based on the address of the InterBOX 3; a capsulating processing section 18 for capsulating/decapsulating IPv6 packets with IPv4 to thereby enable communications with the IPv6 terminal 2; and a routing section 19 for routing communications between the IPv6 terminal 2 and other terminals and servers. In addition, the InterServer 6 has an IPv6 terminal model identification section 21 for determining the model of the IPv6 terminal 2 based on the IPv6 address of the IPv6 terminal 2; a command setup section 22 for converting a command to be sent to the IPv6 terminal 2 to a predetermined command and setting it based on the result from the IPv6 terminal model identification section 21; a filter section 23 for filtering the tunnel-transmitted IPv4 packets using predetermined rules; and a communication session disconnection section 24 for disconnecting communication sessions in predetermined cases. Packet transmissions are performed by a transmission processing section 25.

Further, the InterServer 6 is connected to a user management server 30. As discussed in detail later, the user management server 30 manages user information for each InterBOX 3 and IPv6 terminal 2, and has a user information management DB 31 for storing the member information of each user, such as an ID, a password, and billing information, as well as the IPv6 prefix, model information, and so on.

Furthermore, the InterServer 6 has a Web server 32, which is open to public on the IPv4 Internet network, and receives requests from a user of the InterBOX 3 or the IPv6 terminal 2 to allow the user to configure various settings. For example, at least some of filtering rules applied at the filter section 23 may be changed by the user via the Web server 32. Note that this Web server 32 may be accessed through the InterBOX 3 and the InterServer 6 or through the IPv4 Internet network 4.

Figure 4:
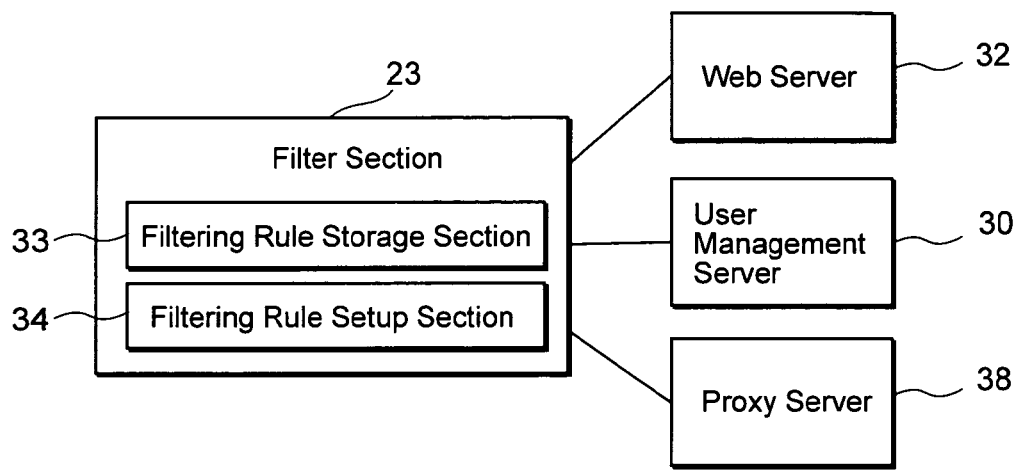
FIG. 4 is a diagram showing a schematic structure of a filter section.

As shown in FIG. 4, the filter section 23 has a filtering rule storage section 33 and a filtering rule setup section 34. The filtering rule storage section 33 and the filtering rule setup section 34 are connected to the Web server 32, which is installed with an interface generation section 35 for interacting with the InterServer, as shown in FIG. 3. A user connected to the Web server 32 can enter or change the filtering rules by displaying on the user's terminal an interface generated by the interface generation section 35. Possible filtering rules which may be configured here include, for example, ones related to security.

Purposes of the security filtering rules are possibly to: (1) deny all access attempts to the home network from outside; (2) deny all access attempts to the home network from outside except from pre-accepted servers (Web sites) and networks; and (3) allow access to the home network from outside without restriction. Thus, the filtering method may allow only specific ports or may deny all access attempts.

Additionally, access from the home network 1 to outside may be restricted, for example, to prevent children from accessing harmful contents and to generally prevent users from accessing fraudulent Web sites.

These filtering rules may be configured after ID and password authentication by a user authentication section 36, which is provided in the Web server 32 and connectable to the user management server 30, as shown in FIG. 3.

The filtering rule setup section 34, which configures the filtering rules based on the user entry as described above, also has a function to generate the filtering rules automatically based on the member information (such as billing and terminal model information) stored in the user management server 30 without using the user entry. For example, the filtering rules may be configured as a gateway to, for example, allow no connections or allow access only to specific servers depending on the user's attributes and membership dues payment status.

These filtering rules as a gateway may be used to control vendors which provide a fee-based business via the InterServer 6. For example, the InterServer 6 may be provided with a proxy server 38, as shown in FIG. 3, for storing addresses a user accesses in a user access information DB 39 and managing them to thereby allow the user to connect only to those addresses preset in the filtering rule setup section 34. In this case, it is preferred to implement a function to recognize which services the user uses and terms of each service contract in addition to the user ID and password in the user information management DB 31, and control transactions according to the terms. For specific vendors, only samples, but not the true screens, may be displayed to users who have not completed a registration procedure.

Figure 5:
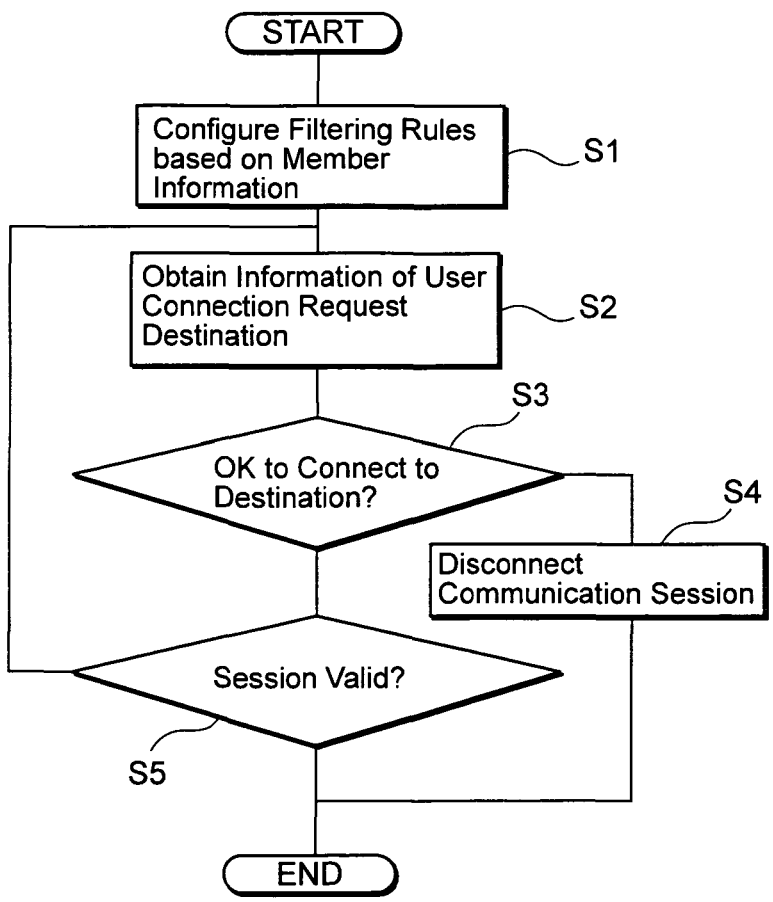
FIG. 5 is a flowchart showing processing at the filter section.

FIG. 5 is a flowchart showing processing at the filter section 23. First, when a tunneling session is started, the filter section 23 configures the filtering rules based on the member information received from the user management server 30 (step S1). Next it receives information of the destination to which the user requested a connection (for example, a Web site address) from the proxy server 38 (step S2). Then the filter section 23 applies the filtering rules to the connection destination information, determines whether or not the access should be permitted (step S3), and disconnects the communication session through the communication session disconnection section 24 if the connection is not permitted (step S4). If the connection is permitted, the filter section 23 determines if the session is still valid (step S5). If so, the processing of the steps S2-S5 is repeated. If the session is no longer valid, the processing is terminated.

Also the proxy server 38 may measure the data communication traffic so that it can deny access from users who have not paid their bills. In this case, the vendor may be informed of the ID's, but not the passwords or IP addresses of those users. Thus, the user should simply manage a pair of ID and password for the InterServer 6. It is appropriate to check the ID as a key each time for system consistency since the IP address may be changed for the user's convenience or other reasons and since there may be a risk of data obtained at the vendor side being used for a malicious access.

Implementation of the filtering rules and disconnection and connection of communication sessions based on these rules are performed by the communication session disconnection section 24. Incidentally, filtering methods, gateway methods, and other methods using the configured filtering rules are publicly known and therefore omitted herein.

The InterServer 6 has an IPv6 terminal search section 26 (FIG. 3) for providing users who do not know the address of the IPv6 terminal 2 with an ability to find the IPv6 terminal 2. The IPv6 terminal search section 26 searches for and identifies a desired IPv6 terminal 2 based on user-specified information, for example, the operation state of the IPv6 terminal 2 and the network.

Figure 6:
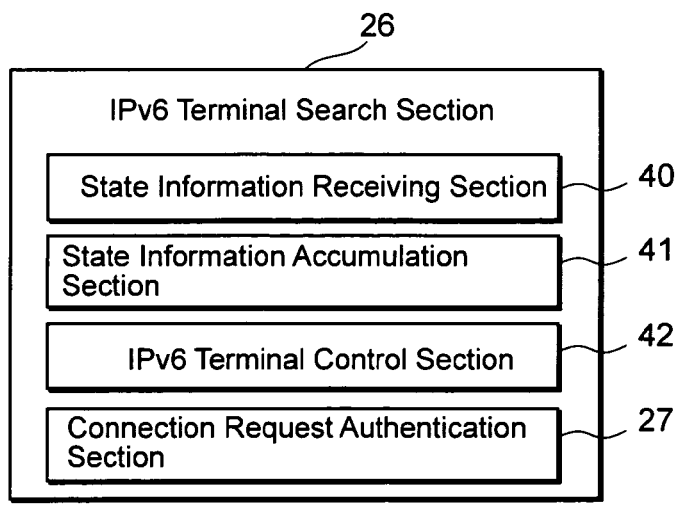
FIG. 6 is a diagram showing a schematic structure of an IPv6 terminal search section.

To do this, as shown in FIG. 6, the IPv6 terminal search section 26 has a state information receiving section 40 for receiving state information such as the operation state of the network and the IPv6 terminal 2 which is connected to the IPv6 home network 1 and the InterBOX 3; a state information accumulation section 41 for storing the received state information in association with the IP addresses of the IPv6 terminal 2 and the InterBOX 3; and an IPv6 terminal control section 42.

The state information receiving section 40 receives state information of each IPv6 terminal 2 for each prefix or domain (the IPv6 network or the InterBOX 3) which houses the IPv6 terminal 2. The state information receiving section 40 may receive the state information by querying the state for the respective prefix or domain either at predetermined intervals or on receipt of a reference request for each prefix or domain. In the former method, for example, a power ON/OFF state of each IPv6 terminal 2 is queried every minute for the corresponding InterBOX registered in the InterBOX IPv4 address 16*a*.

The state information accumulation section 41 stores the state information of each IPv6 terminal 2 in association with the IPv6 terminal 2 and the InterBOX 3. In this case, the obtained state information includes at least one of an operation state, a usage state, location information, property information, information maintained at a node (the InterBOX 3 or the IPv6 terminal 2), and information useful for identifying the node.

The operation information includes at least one of a power state, a network connection state and a communication state. The usage state includes at least one of user information, operation time information and load information. The location information includes at least one of a geographical location, coordinate information, a zip code, a room number and the like. The property information includes at least one of a type, functions, a shape, colors, device information, software information and administrator information of the node.

Additionally the model determined by the IPv6 terminal model identification section 21 is individually stored as state information. The state information receiving section 40 identifies information obtainable from the IPv6 terminal 2 based on the model information, and obtains required information in a format appropriate for the obtainable information.

The IPv6 terminal search section 26 is provided with a connection request authentication section 27 for connecting to the user management server 30 to authenticate the user performing the search or issuing the connection request, and permit the search or the connection request. In the case of a user's home network (with the InterBOX 3), for example, only specific users permitted to connect to this home network are allowed to search and connect. If the connection request authentication section 27 gives a positive result, the IPv6 terminal search section 26 accesses the state information accumulation section 41 and the address storage section 16, and searches for the address of a desired IPv6 terminal 2 (and identifies the InterBOX 3).

When a user searches for the InterBOX 3 of the user's own home network from outside using a personal computer, for example, the search results may be displayed as a list of all IPv6 terminals 2, as well as their states, which are connected to the InterBOX 3. FIG. 7 is an example of a search screen and FIG. 8 is an example of a list display of search results for the InterBOX. In the example of a search interface shown in FIG. 7, there are provided an entry field 43 for searching for the InterBOX 3 and an entry field 44 for searching for the IPv6 terminal 2, and the search interface is programmed to enable searching from either one of them.

In the example of a search result list display shown in FIG. 8, all IPv6 terminals 2 connected to the InterBOX 3 are listed together with respective owner, state, type and model information. Further by pressing an operation screen display button indicated with 45 in the figure, the IPv6 terminal control section 42 is activated and an operation screen (not shown) is displayed according to the type and model of the IPv6 terminal 2.

Figure 9:
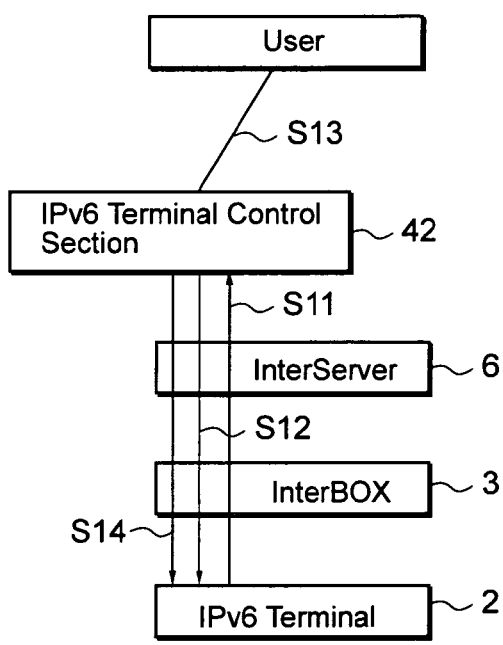
FIG. 9 is a diagram showing a control concept of an IPv6 terminal control section.

FIG. 9 is a conceptual diagram of a control by the IPv6 terminal control section 42.

First, the IPv6 terminal 2 notifies its operation state in response to a request from the state information receiving section 40 (step S11) while the InterBOX 3 is connected to the InterServer 6 through a tunneling session. At this point, it may be configured so that the operation state cannot be obtained unless the IPv6 terminal 2 logs in the IPv6 terminal control section 42. The obtained operation state is accumulated and updated in the state information accumulation section 41 on a regular basis (step S12).

Next, the user of the IPv6 terminal 2 logs in from outside using his ID and password, and identifies a terminal to control from the list as described above to activate the IPv6 terminal control section 42 (step S13). The IPv6 terminal control section 42 processes all instructions on the server side and sends appropriate commands to the terminal device to control it.

Also the user may select a terminal name from the list to thereby connect to the selected IPv6 terminal via routing. Further, the user may enter a specific state as a search condition and, if a terminal with that condition is found, may connect to the terminal directly. Note that the connection to the terminal is made after a tunneling connection is established even when the user searches for the terminal from outside of the home network via the Web server without using the tunneling connection through the InterServer 6.

Here, the "tunneling" refers to technologies for connecting IPv6 networks (router) through an IPv4 network, and more specifically refers to technologies for transmitting IPv6 packets by capsulating the IPv6 packets with IPv4 between specific routers.

In practice, the components 10-42 of the InterBOX 3 and InterServer 6 are configured by use of hard disks in a computer system and computer software programs installed in those areas, as well as a CPU, a RAM, and peripheral equipment such as other input and output devices for controlling the hard disks to read the programs.

Additionally the InterBOX 3 preferably comprises one computer system which includes each IPv6 terminal 2, whereas the InterServer 6 preferably comprises a plurality of computer systems which are connected to one another for load sharing. For example, the IPv6 terminal search section 26 for managing the states of the InterBOX 3, the IPv6 terminal 2 and the home network preferably is configured in a server with a dedicated transmission interface and a control section. This is because load sharing may be needed to address an immense number of predicted sessions managing ON/OFF and other states of each device. Also when one InterServer 6 processes InterBOX'es and IPv6 terminals from different manufacturers, there may be provided a plurality of the capsulating processing sections 18, command setup sections 22, filter sections 23 and the like.

Hereinafter, operations of the InterBOX 3 and InterServer 6 are described in accordance with communication examples shown in FIG. 10 and later figures.

Figure 10:
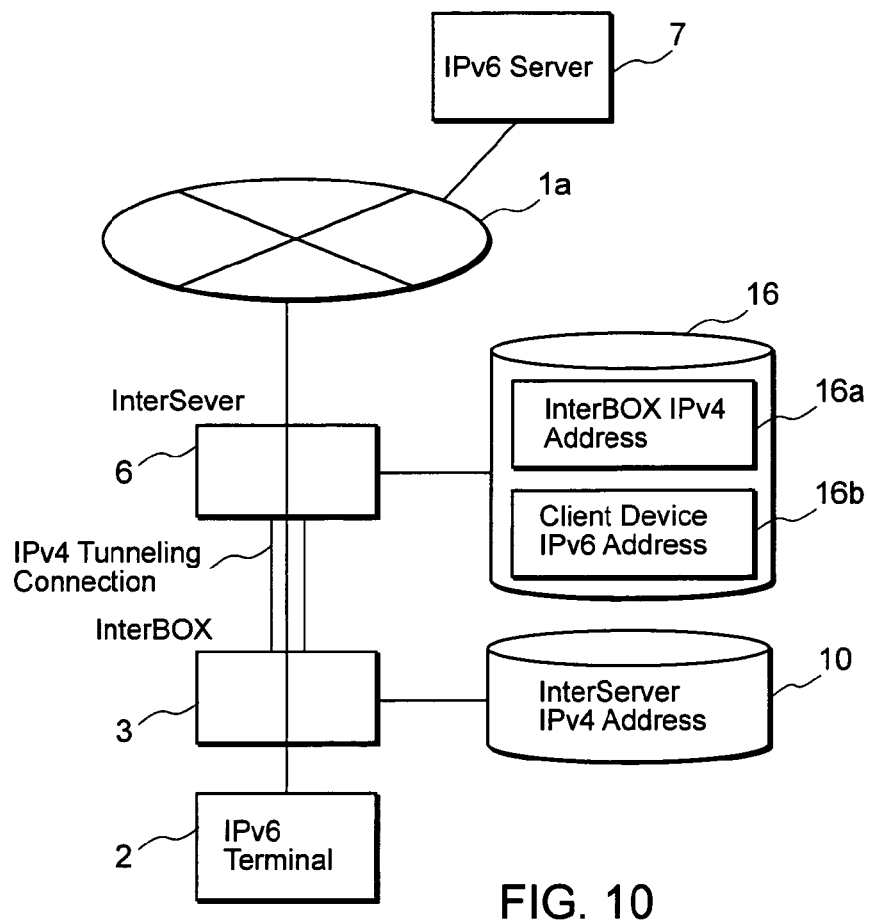
FIG. 10 is a function diagram showing a communication example in the present embodiment.

FIG. 10 shows communications between an IPv6 terminal 2 of the IPv6 home network 1 connected to the InterBOX 3, and an IPv6 server 7 connected to the InterServer 6 directly or via the IPv6 home network 1a.

The present example shown in FIG. 10 is based on the assumption that the InterBOX IPv4 address 16a and the client device (IPv6 terminal 2) IPv6 address 16b are pre-stored in the InterServer 6. Accordingly, the IPv6 terminal 2 needs to notify the InterServer 6 of the IPv6 terminal's own IPv6 address in advance, for example, via the InterBOX 3 or other means. This operation may be achieved by, for example, a user connecting the IPv6 terminal 2 to the IPv6 home network 1 with a plug-and-play feature to thereby automatically establish a tunneling connection between the InterBOX 3 and the InterServer 6. Upon learning the IPv6 address of the IPv6 terminal 2, or part of the IPv6 address (an IPv6 address prefix of the InterServer), the InterServer 6 makes an announcement (broadcast) to other ISP routers in order for routing to the IPv6 address to go through this InterServer 6.

Note that if the IPv6 address of the IPv6 terminal 2 depends on a prefix assigned to the InterBOX 3, only the IPv6 prefix of the InterBOX 3, which constitutes part of the address, may be stored as the client device (IPv6 terminal 2) IPv6 address 16b in the InterServer 6. In this case, the InterServer 6 makes an announcement to other ISP routers of routing information of its prefix.

Under the conditions where the above processing and configurations (for a tunneling connection) are already implemented, if a request is issued for a connection from the IPv6 server 7 to the IPv6 terminal 2, the connection from the IPv6 server 7 is routed to the InterServer 6. The InterServer 6 determines the IPv4 address of the InterBOX 3 from the IPv6 address of the IPv6 terminal 2, and establishes a communication session with the InterBOX 3 within the tunneling connection via the tunneling session establishing sections 17 and 11.

Once a tunneling communication session is established, packets to the IPv6 terminal 2 are transmitted after being capsulated in IPv4 packets for the InterBOX 3 by the capsulating processing section 18. In the InterBOX 3, the capsulating processing section 12 decapsulates those packets while the routing processing section 13 processes routing to the IPv6 terminal 2 based on its address included in the packets. Thus a connection to the IPv6 terminal 2 in an IPv6 home network at home, for example, may be activated by an external IPv6 server 7.

If the IPv6 terminal 2 is, for example, a home security camera, this camera may be activated and controlled even when the home owner is outside of home through the InterServer 6 and the InterBOX 3 by connecting the home owner's PDA and the like to a nearest IPv6 network.

Also in this example, the IPv6 terminal model identification section 21, the command setup section 22, and the filter section 23 provided in the InterServer 6 function according to the model of the IPv6 terminal 2.

The IPv6 terminal model identification section 21 is configured to determine the model of the IPv6 terminal 2 and a network environment based on, for example, the IPv6 address of the IPv6 terminal (address itself or information associated with the address). In this example, the IPv6 terminal 2 and the InterServer 6 are assumed to be produced by the same manufacturer or under a unified standard, wherein the model of the terminal or the network environment may be easily determined from the IPv6 address assigned to (or generated for) the IPv6 terminal 2 by presetting a certain set of rules to the IPv6 address. In this case, the manufacturer and the model are determined based on the prefix section and the MAC address section within the IPv6 address.

When a special command is required to manage the IPv6 terminal 2, the command setup section 22 converts a command included in the communication from the IPv6 server 7 to a command specific to the model. For example, commands may be generated from a message described in the HTML language. Alternatively, an instruction from one IPv6 server 7 may be converted to commands for a plurality of IPv6 terminals 2.

Moreover, the filter section 23 has a function to filter IPv6 packets passing through the InterServer 6 based on predetermined rules. These filtering rules may be predetermined, for example, at a connection destination IPv6 terminal 2 or each network. The communication session disconnection section 24 is configured to disconnect communication sessions if the IPv6 terminal model identification section 21 does not recognize models or network environments as predetermined, or if the filter section 23 returns a negative result. In addition, if a connection destination IPv6 terminal cannot be connected due to its power OFF state and the like, and if there are any alternative IPv6 devices connected to the same InterBOX, communication sessions may still be routed to those other IPv6 terminals based on their model or type information.

Figure 11:
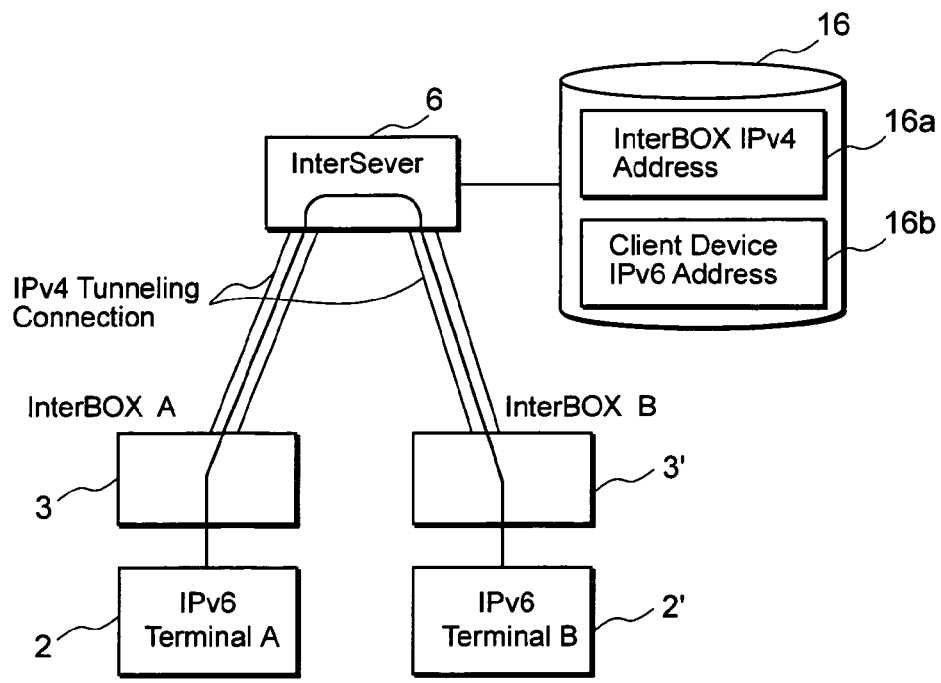
FIG. 11 is a function diagram showing another communication example in the present embodiment.

FIG. 11 is an example of a connection via the InterServer 6 between IPv6 home networks which have InterBOX'es 3 and 3', respectively. IPv6 terminals A and B are connected to the IPv6 home networks, respectively, and communications between these two IPv6 terminals A and B are described below.

Again in this case, the InterServer 6 stores an entirety or part of the addresses of the IPv6 terminals A and B in association with the respective IPv4 addresses of the InterBOX'es 3 and 3'.

When a connection from one IPv6 terminal A to the other IPv6 terminal B is requested, first a communication session within the tunnel connection is established between the InterBOX A of the IPv6 terminal A and the InterServer 6. Next the InterBOX B is identified based on the address of the IPv6 terminal B included in the packets, to thereby establish a tunneling communication session between the InterServer 6 and the InterBOX B. Then the InterBOX B performs an intra-network routing based on the IPv6 address of the IPv6 terminal B included in the packets.

In this way, the two IPv6 terminals may communicate with each other with IPv6 through the InterServer 6.

In the above case, the address of the connection destination IPv6 terminal may be unknown when communications between the two IPv6 terminals are desired. In this situation, the user who is originating this connection accesses the InterServer 6 and activates the IPv6 terminal search section 26. During this time, for security reasons, the connection request authentication section 27 authenticates this user and determines if the connection request is legitimate to permit searches for the connection destination IPv6 terminal and its user. If the desired IPv6 terminal was successfully identified, a tunnel communication session is established based on the IPv6 address of the desired IPv6 terminal.

According to the above structure, all communications related to the IPv6 terminal 2 are performed through the InterServer 6 regardless of their carriers and ISP's, enabling an owner of the InterServer 6 to freely configure and control the IPv6 terminal 2 and the server 7 on his home or workplace network. Thus all problems related to conventional in-home routing, security and individual identification of the IPv6 device where IPv6 and IPv4 coexist can be solved, and extremely open and yet closed networks can be realized.

Normally the owner of the InterServer 6 is assumed to be a manufacturer of the IPv6 terminal 2. Therefore, this manufacturer may create added values for users, utilizing the Internet by preparing its own IPv6 device lineup compatible with the InterServer 6.

Next sign-up of the IPv6 terminal 2 is described below in accordance with FIG. 12.

In the above description, the IPv6 address of the IPv6 terminal 2 is received from the InterBOX 3. In practice, however, there are various other possible methods. Also the manufacturer and/or the owner of the InterServer 6 may be interested in obtaining information on the owner (user) of the IPv6 terminal 2. Furthermore, the address of the IPv6 terminal 2 may in some case be: a factory default fixed IPx6 address written into the RAM of the IPv6 terminal 2; or determined according to the IPv6 prefix of a connecting InterBOX 3.

Figure 12:
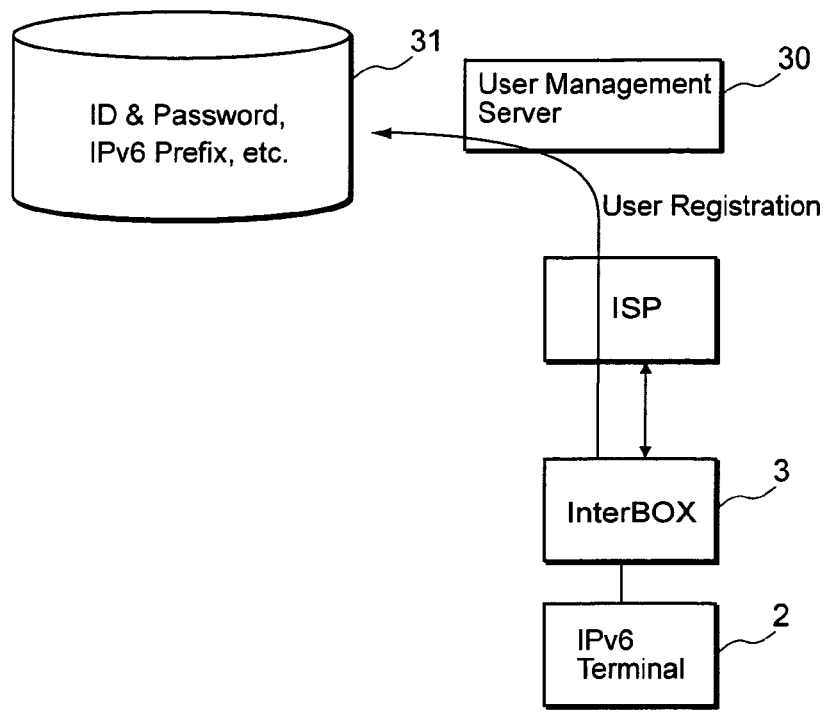
FIG. 12 is a diagram showing a setup example of the InterBOX or an IPv6 terminal.

Therefore in the present embodiment, as shown in FIG. 12, the user of the IPv6 terminal 2 or the InterBOX 3 should first connect to the user management server 30 to perform a user registration. The user registration may be done by using the IPv6 terminal 2 through the InterBOX 3, or using IPv4-communication-enabled equipment such as an existing personal computer or the like. In this embodiment, described is the case wherein the IPv6 terminal 2 and the InterBOX 3 are used. Also in the following, described is the case wherein the IPv6 address of the IPv6 terminal 2 is generated as a combination of an IPv6 address prefix assigned to the InterBOX 3 and a MAC address of the IPv6 terminal 2.

When the user first connects the IPv6 terminal to the InterBOX 3, the InterBOX 3 connects to the user management server 30 via the ISP/carrier. Accordingly, information required for a tunneling connection from the InterBOX 3 to the InterServer 6 and the IPv6 prefix are passed to the user management server 30. The user also passes, to the user management server 30 through the InterBOX 3, information about the user, the InterBOX 3, or the IPv6 terminal 2; information regarding the IPv6 terminal 2 model and the network 1; and information required for billing and the like. In the present example, the InterBOX 3 or each user is issued with an ID and a password, in association with which information of the InterBOX 3 or each user is registered in the user information management DB 31. Note that information required for the registration is not limited to the above and that the above and other information may not be required if the password and billing information are unnecessary.

Also, the IPv6 address prefix of the InterBOX 3 may be assigned and stored in the InterBOX 3 during manufacture, for example, or may be notified of from the server for the first time upon the user registration in the above manner. In the latter case, in order to perform the user registration on the Internet via no InterBOX 3 but an existing personal computer or the like, the IPv6 prefix, the ID, and the password are manually configured into the InterBOX 3. After the completion of such a user registration, information required for the connection is stored in the InterBOX 3 and the IPv6 terminal 2 as well. In this case, the IPv6 terminal model identification section 26 provided in the InterServer 6 may be configured to determine the model based on information registered by the user.

The above-described user management server 30 may be connected to the InterServer 6 or may be independently provided on the Internet.

Figure 13:
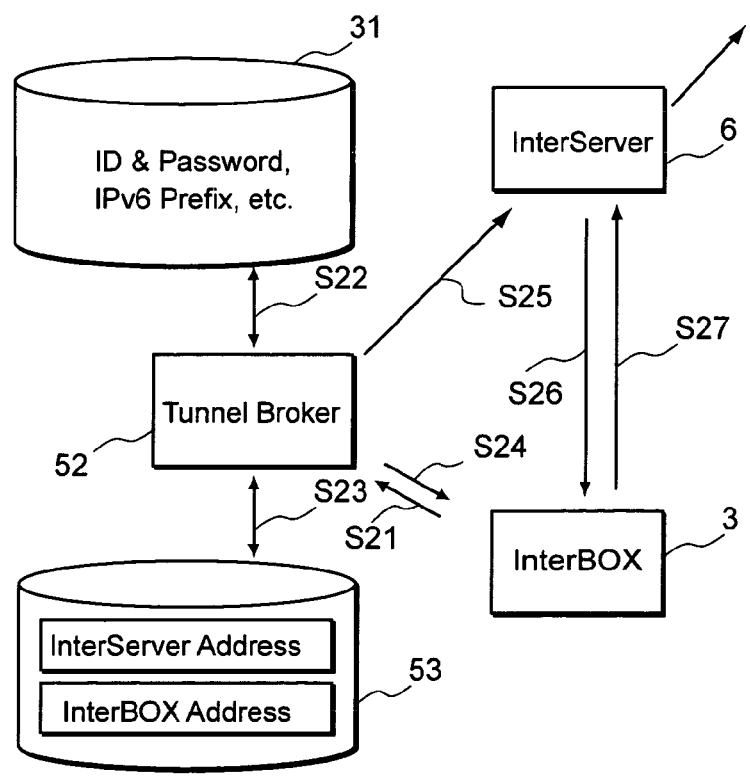
FIG. 13 is a diagram showing a tunneling connection example between the InterBOX and the InterServer.

FIG. 13 shows an embodiment of a specific method for establishing a tunneling connection and a communication session within the tunneling connection. Each of the reference numerals/symbols S21-S27 in this figure corresponds to each of the following steps S21-S27.

In this embodiment, the InterBOX 3 stores the IPv4 address of the InterServer 6 therein: this address may be stored in the RAM by the manufacturer as a factory default, or may be received from another server and the like upon an actual tunneling connection. The former may be employed if there is a single InterServer 6, and the latter may be more efficient if there are a plurality of InterServers 6.

The diagram in FIG. 13 is an example of the latter, and a tunnel broker 52 is provided accordingly. The tunnel broker 52 is configured so that the user information management DB 31 is called for reference. The tunnel broker 52 is also connected to an address database 53 for storing the IPv4 addresses of the InterServer 6 and the InterBOX 3. In addition, the InterBOX 3 is preset with an IPv4 global address of the tunnel broker 52. The InterBOX 3 is also preconfigured with the ID and the password (if required) described above.

The InterBOX 3 first connects to the tunnel broker 52 and sends the ID and the password (step S21). The tunnel broker 52 authenticates the InterBOX 3 and concomitantly obtains the IPv6 address prefix of the InterBOX 3 (step S22). Next the tunnel broker 52 selects from the address database 53 a destination InterServer 6 of a tunnel connection to be established (step S23), and notifies the InterBOX 3 of the IPv4 address of this InterServer 6 (step S24). Also the tunnel broker 52 passes to the InterServer 6 the IPv4 address of the InterBOX 3 and the IPv6 prefix (part of the address of the IPv6 terminal 2) for identifying the IPv6 terminal (step S25). In this manner, the InterBOX 3 can identify the InterServer 6 and establish the tunneling session (steps S26 and S27). Further, the InterServer 6 announces other routers of routing of the notified IPv6 prefix. Thus all routings of IPv6 addresses with the above prefix go through the InterSever 6.

According to such a structure, if there are multiple InterServers 6, the establishment of the tunneling connection may be ensured through one of them. Incidentally, the user and terminal authentication is performed with the tunnel broker 52 above, but this does not limit the authentication method of the present invention. The tunneling broker 52 may notify the InterBox 3 of the address of the InterServer 6 only, and the InterServer 6 may perform the user authentication. Also at this point, the InterServer 6 may give an arbitrary address to the InterBox 3 or the IPv6 terminal 2.

It is to be understood that the embodiment heretofore described is no more than one embodiment of the present invention, and that various changes and modifications can be made, without departing from the scope and spirit of the present invention.

For example, the tunneling connection may be established from both the InterBOX 3 and the InterServer 6 in the above one embodiment. However, the tunneling connection may be generally established only from the InterBOX 3 in actual commercial services. This is due to a rarity of IPv4 fixed IP services. This is because routing is impossible if the IPv4 session itself is actually disconnected: in this case, the configuration remains intact once the tunneling (in practice IPv4 connection itself) is established until the IPv4 session is disconnected, and the next IPv4 of the InterBOX 3 is seldom the same as before.

Further, the above one embodiment illustrated with the first protocol as IPv6 and the second protocol as IPv4 is not intended to limit these protocols. The second protocol may also be IPv6. Also both the first and the second protocols may be IPv4. Furthermore, both may be other than the above protocols.

In the above one embodiment, the InterBOX 3 is provided independently of each IPv6 terminal, but the InterBOX 3 itself may be the IPv6 terminal, or the InterBOX 3 may be configured integrally with any IPv6 terminal or every IPv6 terminal as hardware or software. In the latter case, there may be a plurality of the InterBOX'es in a single home network.

Having described the invention, the above examples are given to illustrate specific applications of the invention including the best mode now known to perform the invention. These specific examples are not intended to limit the scope of the invention described in this application.

What is claimed is:

1. An Internet connection system, comprising:
 a relay device located in a first network and connected to a client device and provided in the first network, the first network communicated in a first protocol; and
 a server communicating with the relay device through a second network in a second protocol, the second network being the Internet;
 wherein the relay device comprises:
 a client device global address storage section for storing a global address of the client device in the first protocol;
 a server address storage section for storing a global address of the server in the second protocol;
 a first routing device for routing a connection from the client device through the server based on the global address of the server stored in the server address storage section; and
 a first packet processing device for encapsulating and decapsulating packets, the packets being in the first protocol, using the second protocol to thereby establish a tunneling connection with the server in the first protocol;
 and wherein the server comprises:
 a second packet processing device for encapsulating and decapsulating packets, the packets being in the first protocol, using the second protocol to thereby enable said tunneling connection via the Internet with the relay device in the first network;
 a client device global address management device for managing the global address of the client device in the first protocol, the client device connected to the relay device, in association with said tunneling connection with the relay device;
 a tunneling establishing device for establishing a plurality of independent tunneling connections with a plurality of relay devices located in different first networks, said tunneling connection which said relay device establishes with said server being any one of the plurality of independent tunneling connections; and
 a second routing device configured to identify a particular tunneling connection among the plurality of tunneling connections when the server receives via the second network a connection request to a particular client device, and for routing the connection to the identified particular tunneling connection, based on the global address of the client device included in the request and managed by the client device global address management device.

2. The Internet connection system of claim 1, wherein the first and second protocols are different.

3. The Internet connection system of claim 1, wherein the first and second protocols are the same.

4. The Internet connection system of claim 1, wherein the server further comprises a model identification section for determining if the client device is of a predetermined model and/or the relay device is of a predetermined model.

5. The Internet connection system of claim 4, wherein the server further comprises a communication session disconnection section for disconnecting communication sessions or limiting packet transmissions if the model identification section determines that the client device or the relay device is not of the predetermined model.

6. The Internet connection system of claim 4, wherein the server further comprises a command conversion section for converting a command to be sent to the client device to a command in a predetermined format to control the client device based on results from the model identification section.

7. The Internet connection system of claim 4, wherein the server further comprises a client device control section for controlling the client device based on results from the model identification section.

8. The Internet connection system of claim 1, wherein the server further comprises a network type identification section for determining if an environment of the first network connected with the client device and/or the relay device is of a predetermined type.

9. The Internet connection system of claim 8, wherein the server further comprises a communication session disconnection section for disconnecting communication sessions or limiting packet transmissions if a private network environment connected with the client device or the relay device is determined not of the predetermined type.

10. The Internet connection system of claim 9, wherein the server further comprises a state information obtaining section for obtaining at least one of an operation state, a usage state, and location information of the client device and/or the relay device.

11. The Internet connection system of claim 10, wherein the state information obtaining section obtains at least one of the operation state, the usage state, and the location information of the client device using a method according to a model of the client device.

12. The Internet connection system of claim 11, wherein the search section comprises a means for displaying a list of the client devices connected to each of the relay devices.

13. The Internet connection system of claim 12, wherein the server further comprises a client device control section for controlling the client device, which selects a specific client device from the list to thereby activate a control program for the specific client device.

14. The Internet connection system of claim 10, wherein the server further comprises a search section for searching for the client device or the relay device based on at least one of the global address, the operation state, the usage state, and the location information of the client device or the relay device.

15. The Internet connection system of claim 14, wherein the search section comprises a means for displaying a list of the client devices found by the search section, each with the operation state.

16. The Internet connection system of claim 1, wherein the server further comprises a client device address search section for searching for the global address of the client device in the first protocol based on a connection request to the client device.

17. The Internet connection system of claim 16, wherein the server further comprises a connection requester authentication section for authenticating a user who requested a connection to the client device to thereby permit or deny the connection to the client device.

18. The Internet connection system of claim 1, further comprising:
a tunneling connection information management device for managing information of the tunneling connection between the relay device and the server, wherein
the tunneling connection information management device notifies the relay device of the server's global address in the second protocol, and notifies the server of an entire or partial global address of the client device in the first protocol.

19. The Internet connection system of claim 18, wherein the tunneling connection information management device authenticates the relay device or the server to obtain an authentication result and, if the authentication result is positive, sends the notification.

20. The Internet connection system of claim 1, wherein the server further comprises a filtering processing device for filtering communications to/from the client device according to predetermined rules.

21. The Internet connection system of claim 20, wherein the server further comprises a filtering rule setup section for providing an interface for editing the predetermined rules.

22. The Internet connection system of claim 1, wherein the relay device further comprises a model identification section for determining if the client device is of a predetermined model.

23. The Internet connection system of claim 22, wherein the relay device further comprises a communication session disconnection section for disconnecting communication sessions if the model identification section determines that the client device is not of the predetermined model.

24. The Internet connection system of claim 1, wherein the client device includes a peripheral device which is communicable with the relay device but cannot by itself connect to the Internet.

25. The Internet connection system of claim 1, wherein the relay device is provided in the client device.

26. An Internet connection system, comprising:
a relay device connected to a client device and provided in a first network, the first network communicated in a first protocol; and
a server communicating with the relay device through a second network in a second protocol, the second network being the Internet,
wherein the relay device comprises:
a client device global address storage section for storing a global address of the client device in the first protocol;
a server address storage section for storing a global address of the server in the second protocol;
a first routing device for routing a connection from the client device through the server based on the global address of the server stored in the server address storage section; and
a first packet processing device for encapsulating and decapsulating packets, the packets being in the first protocol, using the second protocol to thereby establish a tunneling connection with the server in the first protocol;
and wherein the server comprises:
a second packet processing device for encapsulating and decapsulating packets, the packets being in the first protocol, using the second protocol to thereby enable said tunneling connection via the Internet with the relay device in the first network;
a client device global address management device for managing the global address of the client device in the first protocol, the client device connected to the relay device, in association with a global address of the relay device in the second protocol;

a tunneling establishing device for establishing a plurality of independent tunneling connections with a plurality of relay devices located in different first networks, said tunneling connection which said relay device establishes with said server being one of the plurality of independent tunneling connections;

a second routing device configured to identify a particular tunneling connection among the plurality of tunneling connections when the server receives via the second network a connection request to a particular client device, and for routing the connection to the identified particular tunneling connection, based on the global address of the client device included in the request and managed by the client device global address management device;

a network type identification section for determining if an environment of the first network connected with the client device and/or the relay device is of a predetermined type;

a communication session disconnection section for disconnecting communication sessions or limiting packet transmissions if a private network environment connected with the client device or the relay device is determined not of the predetermined type; and a state information obtaining section for obtaining at least one of an operation state, a usage state, and location information of the client device and/or the relay device, wherein the state information obtaining section obtains at least one of the operation state, the usage state, and the location information of the client device using a method according to a model of the client device.

27. An Internet connection system, comprising:

a relay device connected to a client device and provided in a first network, the first network communicated in a first protocol; and a server communicating with the relay device through a second network in a second protocol, the second network being the Internet, wherein the relay device comprises:

a client device global address storage section for storing a global address of the client device in the first protocol;

a server address storage section for storing a global address of the server in the second protocol;

a first routing device for routing a connection from the client device through the server based on the global address of the server stored in the server address storage section; and a first packet processing device for encapsulating and decapsulating packets, the packets being in the first protocol, using the second protocol to thereby establish a tunneling connection with the server in the first protocol;

and wherein the server comprises:

a second packet processing device for encapsulating and decapsulating packets, the packets being in the first protocol, using the second protocol to thereby enable said tunneling connection via the Internet with the relay device in the first network;

a client device global address management device for managing the global address of the client device in the first protocol, the client device connected to the relay device, in association with a global address of the relay device in the second protocol;

a tunneling establishing device for establishing a plurality of independent tunneling connections with a plurality of relay devices located in different first networks, said tunneling connection which said relay device establishes with said server being one of the plurality of independent tunneling connections;

a second routing device configured to identify a particular tunneling connection among the plurality of tunneling connections when the server receives via the second network a connection request to a particular client device, and for routing the connection to the identified particular tunneling connection, based on the global address of the client device included in the request and managed by the client device global address management device;

a network type identification section for determining if an environment of the first network connected with the client device and/or the relay device is of a predetermined type;

a communication session disconnection section for disconnecting communication sessions or limiting packet transmissions if a private network environment connected with the client device or the relay device is determined not of the predetermined type;

a state information obtaining section for obtaining at least one of an operation state, a usage state, and location information of the client device and/or the relay device; and a search section for searching for the client device or the relay device based on at least one of the global address, the operation state, the usage state, and the location information of the client device or the relay device.

* * * * *